United States Patent [19]
Yao et al.

[11] Patent Number: 5,980,605
[45] Date of Patent: Nov. 9, 1999

[54] CARBOTHERMAL PRODUCTION OF ALKALI METALS

[75] Inventors: Chengcai Yao, Rehovot; Michael Epstein, Rishon Le-Zion; Amnon Yogev, Rehovot, all of Israel

[73] Assignee: Yeda Research and Development Co. Ltd.,, Rhovot, Israel

[21] Appl. No.: 08/912,069

[22] Filed: Aug. 15, 1997

[51] Int. Cl.⁶ .................................................. C21C 7/00
[52] U.S. Cl. ........................ 75/408; 75/590; 266/168; 266/905
[58] Field of Search .................. 75/589, 590, 408; 266/167, 168, 905, 900, 200

[56] References Cited

U.S. PATENT DOCUMENTS

| | | | |
|---|---|---|---|
| 342,897 | 6/1886 | Castner et al. | 75/589 |
| 1,837,935 | 12/1931 | Ylla-Conte | 75/590 |
| 2,774,663 | 12/1956 | Kirk | 75/590 |
| 2,810,636 | 10/1957 | Kirk | 75/590 |
| 3,044,870 | 7/1962 | McGriff | 75/589 |
| 3,700,430 | 10/1972 | Landt et al. | 75/589 |
| 3,786,138 | 1/1974 | Shalit et al. | 423/648 |
| 4,318,712 | 3/1982 | Lang et al. | 48/202 |

OTHER PUBLICATIONS

JP 55162413, abstract, Derwent WPI. Nov. 1996.
JP 622297341, abstract, Derwent WPI. Nov. 1996.

*Primary Examiner*—Scott Kastler
*Attorney, Agent, or Firm*—Foley & Lardner

[57] ABSTRACT

Production of metallic sodium and potassium by reaction of their hydroxides or carbonates with carbon. The carbon may be produced in situ by pyrolysis of a pyrolyzable carbonaceous material. There are further disclosed a process and installation for performing the production while using solar energy.

13 Claims, 1 Drawing Sheet

CARBOTHERMAL PRODUCTION OF ALKALI METALS

FIELD AND BACKGROUND OF THE INVENTION

The present invention relates to the production of certain elemental alkali metals by means of thermal reduction of their hydroxides or carbonates with carbonaceous material.

There are known in the art processes serving mainly for fuel production an involving such operations. Thus U.S. Pat. No. 3,786,138 discloses the production of $H_2$ by reacting a mixture of carbonaceous material, steam and an excess of molten alkali metal hydroxide at a temperature not exceeding 700° C.

U.S. Pat. No. 4,318,712 discloses a process for the catalytic steam gasification of bituminous or subbituminous coal or lignite in which alkali metal salts are used as catalysts.

JP 55162413 teaches the production of carbon monoxide by reacting a carbonate of alkali metals with a carbonaceous material. The reaction is carried out at a temperature ensuring that the carbonate is in a fused or semi-fused state.

JP 62297341 discloses a composition comprising mainly carbon black and some NaOH or KOH used to improve the blackness in rubber production.

SUMMARY OF THE INVENTION

It is an object of the present invention to provide an improved process for the production of certain alkali metals by thermal reduction of their hydroxides or carbonates.

It is a further object of the present invention to utilize the novel process of the invention for the conversion of solar radiation into useable energy.

It is yet another object of the present invention to utilize the alkali metal produced by the process of the invention in the production of magnesium or aluminum.

In accordance with the present invention there is provided a process for the production of an alkali metal being sodium or potassium, characterized in that a hydroxide or carbonate of said alkali metal is reacted with carbon at a temperature in the range of from about 800 to about 1400° C.

The reaction characterizing the above process may be represented by the following equations:

wherein M is Na or K.

The carbon for the reaction may be introduced as such e.g. in the form of elemental carbon such as coal or charcoal, or it any be produced in situ, e.g. by pyrolysis of pyrolyzable carbonaceous material such as methane, ethane, propane, butane, biomass, fossil fuel and the like. The pyrolysis of such cabonaceous materials also yields hydrogen and depending on the nature of the pyrolyzable material also product volatile hydrocarbons both of which may be used as fuel or for other industrial purposes.

The in situ pyrolysis of pyrolyzable carbonaceous material may be conducted either in a pyrolyzer from which the carbon obtained is transferred to the reaction vessel in which the process of the present invention is carried out, or alternatively in the reaction vessel itself.

The process of the invention may be carried out in a one-step or two-step mode.

The one-step mode in the process of the invention is carried out by mixing in a reaction vessel alkali metal hydroxide or carbonate in a particulate or molten form with carbon, and the reaction mixture is heated up to a temperature of about 1200 to about 1400° C.

The two-step mode of the process of the invention is carried out by mixing in a reaction vessel alkali metal hydroxide in a particulate or molten form with carbon, and resulting first reaction mixture is heated up to a temperature of about 800 to about 1000° C. Formed alkali metal carbonate is mixed with further amounts of carbon to produce a second reaction mixture which is heated up to a temperature of about 1200 to about 1400° C., and vaporous alkali metal obtained in this way is condensed.

The two-step mode of the process according to the invention consumes less energy as compared with a single step operation. The reason is that the first step may be carried at a relatively low temperature, e.g. 800–1000° C., and only the second step is carried at a higher temperature, typically 1200–1400° C. Since some of the alkali metal is already produced at the lower temperature, less overall energy is required, as higher operating temperature leads to a higher thermal losses.

By one of its modifications, the invention provides a process for the production of an alkali metal being sodium or potassium, characterized in that a hydroxide of said alkali metal is reacted in the heat with carbon and $H_2O$ to yield said alkali metal together with carbon monoxide and hydrogen. According to this embodiment, and increase in the production of $H_2$ per mole of reacting hydroxide is achieved together with energy savings due to the fact that the process is carried out at a reduced operating temperature.

If desired, the energy required for the performance of the process of the invention may be derived from concentrated solar radiation. By a preferred mode of utilizing concentrated solar radiation, at least one reactor in used capable of admitting concentrated solar radiation, and concentrated solar radiation is radiated directly on the reactants.

Thus in accordance with one embodiment of the invention there is provided a process for the production of an alkali metal being sodium or potassium with the use of concentrated solar radiation as heat source, comprising:

i) forming a solar reactor a reaction mixture including a hydroxide or carbonated of said alkali metal and carbon;

ii) introducing concentrated solar radiation into said solar reactor to establish therein a desired reaction temperature;

ii) allowing a reduction/oxidation reaction to proceed within said solar reactor and separately withdrawing as products a gaseous mixture of said alkali metal, carbon monoxide and, where applicable also hydrogen; and iv) condensing vaporous alkali metal withdrawn from said solar reactor and withdrawing liquid alkali metal as product.

By another embodiment of the invention there is provided a process for the production of an alkali metal being sodium or potassium with the use of concentrated solar radiation as heat source, comprising:

i) forming in a first solar reactor a reaction mixture including a hydroxide of said alkali metal and carbon;

ii) introducing concentrated solar radiation into said first solar reactor to establish therein a desired reaction temperature;

iii) allowing a reduction/oxidation reaction to proceed in said first solar reactor and separately withdrawing therefrom as first product a gaseous mixture comprising essentially of alkali metal and hydrogen, and as second product a liquid mixture comprising essentially of said alkali metal and the carbonate thereof;

iv) conducting the liquid mixture withdrawn from said first solar reactor into a second solar reactor concurrently with carbon;

v) introducing concentrated solar radiation into said second solar reactor into a second solar reactor concurrently with carbon;

vi) allowing a reduction/oxidation reaction to proceed in said second solar reactor and withdrawing therefrom as third product a gaseous mixture of alkali metal and carbon monoxide; and vii) condensing vaporous alkali metal from the gaseous mixture withdrawn from said first and second solar reactors and withdrawing liquid alkali metal as product.

Concentrated solar radiation may be introduced into the solar reactor in any of several conventional ways. Thus, for direct irradiation of the reactants, the solar reactor may be made of suitable transparent, heat-resistant material such as quartz or have a window of such material, or concentrated solar radiation may be introduced into an opaque reactor via a suitable heat-resistant light guide. Alternatively, an opaque reactor may be heated externally by concentrated solar radiation in which case the reactants are heated indirectly.

As mentioned above, in accordance with the invention, the carbon used in the reactions may be produced in situ from pyrolyzable carbonaceous material such as, for example, a biomass or fossil fuel. In applying this variant to the above specific embodiments for the production of alkali metal with the aid of concentrated solar radiation, the operation comprises using a further solar reactor serving as pyrolyzer, feeding a pyrolyzable carbonaceous material into said further solar reactor, introducing concentrated solar energy into said further solar reactor to establish therein a desired reaction temperature, separately withdrawing therefrom as products carbon and a gaseous mixture of hydrogen and hydrocarbons and feeding the product carbon into the process. If desired, the gaseous mixture withdrawn from the further solar reactor may be subjected to a separation operation for the separate recovery of hydrogen and hydrocarbons, each of which may be used for purposes and in manners per se.

According to another aspect of the invention, there is provided a process for the production of a second metal being magnesium or aluminum from its salt which comprises:

(i) reacting a hydroxide or carbonate of an alkali metal being sodium or potassium with carbon for the production of alkali metal according to the present invention; and (ii) reacting the alkali metal obtained with a salt of the second metal, so as to produce the corresponding second metal therefrom.

The alkali metal used in step (ii) of this process may either be in its liquid phase or in a solid phase. As was mentioned before, the second metal according to this aspect of the invention is magnesium or aluminum, preferably, magnesium. Suitable metal salts according to the present invention, may be for example, $MgCl_2$, $AlCl_3$, minerals comprising magnesium salt such as carnallite, and the like. The step of producing the second metal from its salt by reacting the latter with the alkali metal, is conducted at a relatively low temperature, typically in the range of from room temperature to about 300° C., preferably from about 100 to about 150° C., and is preferably carried out under dry and inert atmosphere. The product of this reaction, comprises a mixture of the second metal with salts of the alkali metal. Separation of the second metal from the salts of the alkali metal to obtain a substantially pure metal product may be made by any method known in the art per se.

The carbon monoxide obtained by the process of the invention may be utilized as fuel, for example in the generation of electricity or in any other applications as known per se, and the carbon dioxide obtained by the combustion of carbon monoxide may be utilized industrially.

In addition or in the alternative, all or some of the carbon monoxide obtained as product from the process of the invention may be subjected to a gas-water shift reaction with water to produce carbon dioxide and hydrogen.

For the performance of the one-step embodiment of the invention with the use of concentrated solar radiation as set out above, the invention further provides a solar energy installation comprising a solar reactor to for introducing concentrated solar radiation into said solar reactor to establish therein a desired reaction temperature; means for separately feeding into said solar reactor carbon and alkali metal hydroxide or carbonate; means for withdrawing from said solar reactor gaseous products; and heat exchanger means for condensing vaporous alkali metal from said gaseous products.

By one embodiment the solar energy installation of the invention is designed for the performance of the two-step mode of the process of the invention and comprises first and second solar reactors, means for introducing concentrated solar radiation into said first and second solar reactors to establish therein desired reaction temperatures; means for feeding alkali metal hydroxide into said first solar reactor; means for withdrawing gaseous products from said first solar reactor; means for conducting liquid product from said first solar reactor to said second solar reactor; means for withdrawing gaseous products from said second solar reactor; and heat exchanger means for condensing vaporous alkali metal from said gaseous products.

In addition, the invention provides an installation as set out above further comprising a third solar reactor, means for introducing concentrated solar radiation into said third solar reactor to establish therein a desired reaction temperature; means for feeding pyrolyzable carbonaceous material into said third solar reactor; and means for withdrawing carbon from said third solar reactor and feeding it into said first and second solar reactors.

Solar radiation for use to provide the reaction heat is concentrated by a concentrating dish or central receiver. Where such concentrators are insufficient for providing the required elevated temperatures, a secondary concentrating device such as a compound parabolic concentrator (CPC) may be used.

When solar radiation is used as the heat source for the process, the solar reactors are preferably of a kind which enable direct absorption of solar energy whereby the thermal efficiency of the process is enhanced.

The two-step mode of the process according to the invention may be performed batchwise in a single vessel, the carbonate formed in the first step by reaction of alkali metal hydroxide being mixed with further amounts of carbon and the temperature in the vessel being raised as required for the performance of the second step. Alternatively, two separate vessels may be used, one for each step, each of said vessels being maintained at the temperature required for the performance of the process step carried out therein. The liquid product obtained in the first vessel is withdrawn and conducted to the second vessel for the second reaction step with carbon.

In the performance of the process according to the invention fluidized bed technology may be employed, both in the single-step mode and in each of the steps of the two-step operation, as well as in the pyrolysis of carbonaceous material.

DESCRIPTION OF THE DRAWINGS

For better understanding the invention will now be described with reference to the annexed FIG. 1 which is a block diagram of a preferred embodiment of the invention.

DESCRIPTION OF A PREFERRED EMBODIMENT

Figure 1:
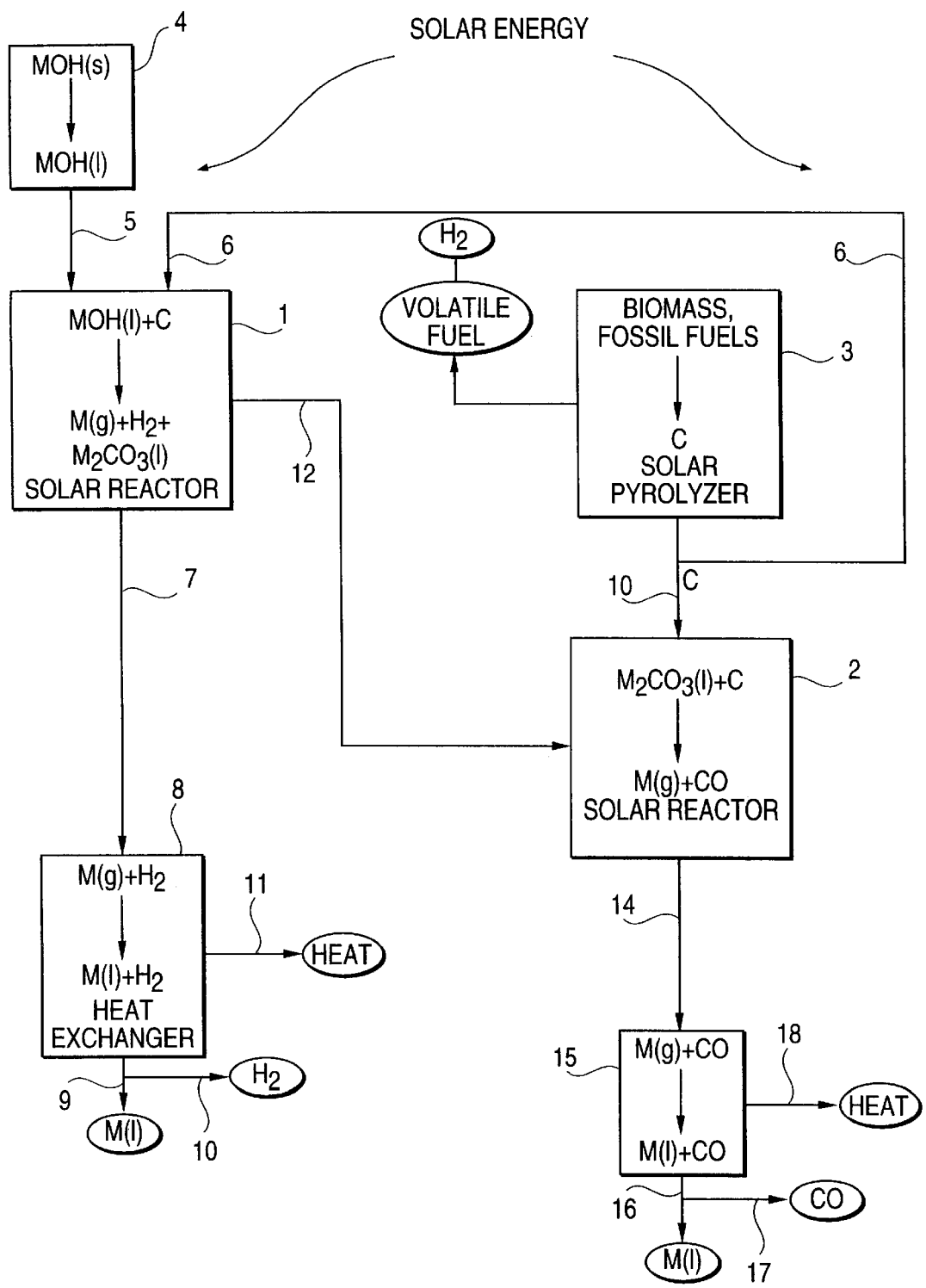

The process diagrammatically shown in FIG. 1 concerns an embodiment of a two-step production of sodium an alkali metal from its hydroxide with the utilization of concentrated solar energy as heat source. As shown, this process is carried out in an installation comprising first, second and third solar reactors designated respectively by the numerals 1, 2, and 3 all designed for the admission of concentrated solar radiation in order to establish therein desired reaction temperatures. The installation further comprises a reservoir 4, of molten alkali metal hydroxide which, if desired, may by heated with heat derived from concentrated solar radiation. In addition, or in the alternative, other heat sources may be used such as, for example, recycled process heat.

In operation molten alkali metal hydroxide from reservoir 4, and carbon, arriving from the third solar reactor 3 which serves as pyrolyzer, are fed via ducting means 5 and 6 respectively into the first and second solar reactors 1 and 2. The reduction/oxidation reaction taking place in the fist solar reactor 1 yields as first product liquid sodium or potassium carbonate. The alkali metal and a second product liquid sodium or potassium carbonate. The gaseous mixture is withdrawn via ducting means 7 into a condenser 8 wherefrom liquid metal is withdrawn at 9, hydrogen at 10 and utilizable heat at 11.

Liquid product comprising essentially alkali metal and the carbonate thereof is withdrawn from reactor 1 and conducted via ducting means 12 to the second reactor 2 which is concurrently charged with carbon arriving from the third solar reactor 3 via ducting means 13. Inside the second solar reactor 2 a reduction/oxidation reaction takes place between the alkali metal carbonate and carbon, yielding a gaseous mixture of carbon monoxide and sodium or potasssium metal, which is withdrawn at 16, CO at 17 and utilizable heat at 18.

The carbon which is charged into reactors 1 and 2 via ducting means 6 and 13 is produced in the solar reactor 3 from a pyrolyzable corbonaceous material such as a biomass or fossil fuel. The pyrolysis in reactor 3 yields as further product a gaseous mixture containing hydrogen and volatile fuel, the latter being essentially a mixture of hydrocarbons.

The liquid alkali metal withdrawn from the heat exchangers 8 and 15 may be allowed to solidify to yield solid alkali or potassium metal.

Alternatively, liquid alkali metal may be withdrawn at 9 and/or 16 and introduced into a further reactor to react with a salt of a second metal, where the second metal being magnesium or aluminum, for the production of the corresponding metal therefrom. The product thus obtained, comprising a mixture of the second metal with salts of the alkali metal, is withdrawn from this further reactor, and undergoes separation to yield a product comprising substantially pure second metal.

Carbon monoxide withdrawn from the second reactor 2 may be used as fuel. In the alternative or in addition, all or part of the carbon monoxide withdrawn from the second reactor 2 may be subjected to a so-called gas-water shift reaction with water in accordance with the equation $$H_2O+CO \rightarrow CO_2+H_2$$

$H_2$ and $CO_2$ being withdrawn as products.

The invention will now be further illustrated by the following working examples to which it is not limited.

EXAMPLES

Example 1

A 20 mm ID stainless steel subular reactor was placed in a cavity of 16×16×20 cm having an aperture of 7 cm diameter and wall 5 cm thick of ceramic insulating plates. The cavity was located so that its aperture coincided with the focal plane of a solar furnace. The reactor was placed parallel to the cavity aperture at a distance of 10 cm therefrom.

A mixture of 1.7 gr of particulate sodium hydroxide and 0.5 gr of graphite particles having a mean diameter of about 1 mm was loaded into the reactor.

After loading the feed mixture, a flux of solar radiation of about 500 KW/m$^2$ was provided at the focal plane of the solar furnace which amounts to about 2 KW delivered through the aperture into the cavity. The final temperature of the reactor reached, was 1200° C.

When the reactor bed temperature reached 650° C., gases started to evolve from the mixture of the reactants. These gases passed through a paraffin oil trap in which sodium was trapped, and were then introduced into a GC analyzer. The GC analysis showed that the gases produced when the bed temperature did not exceed 1050° C. contained mainly hydrogen, whereas the major component of the gases produced at a bed temperature higher than 1050° C. was CO. A total of 1100 ml of gaseous products were collected and the weight of the sodium collected at the paraffin oil trap was about 0.7 gr, which corresponds to 72% of the theoretical yield when full conversion is assumed.

Example 2

1.5 gr of graphite particles having a mean diameter of about 1 mm were loaded into a 30 mm ID tubular stainless steel reactor, placed in a 65 mm ID quartz tube. This setup was placed in the solar furnace so that the center of the stainless steel reactor will be at the furnace focal plane. The reactor was purged with Argon, and then subjected to solar irradiation. The average solar flux used in the experiment was of about 550 KW/m$^2$ reaching the front surface of the reactor. When a steady state temperature of 1200° C. was reached, NaOH kept in a container in a molten phase (at about 350° C.) by using electrical heating elements, dripped onto the graphite particles at a rate of about 0.5 gr/min. The contact of the NaOH with the graphite particles at this elevated temperature resulted in the production of mixture containing mainly sodium, hydrogen and CO. The feeding of the molten NaOH continued until no gases were further produced. 2 gr of sodium were collected at a water cooled trap, and about 3000 ml of gases were collected, out of which about 33% were hydrogen and the balance—CO.

Example 3

10.0 gr of dried anhydride magnesium chloride were introduced into a vessel which was then sealed and evacuated. Dry nitrogen was introduced into the vessel thereafter until a pressure of about 1 atm was measured in the vessel. At this time, 4.0 gr of Na, produced according to the process described in Example 2, were injected through a metallic syringe into the vessel. The vessel was then slowly heated up, until reaching an inside temperature of 100° C. The vessel was left at this temperature for about 5 minutes, and then was cooled down and opened. The product thus obtained was washed with water, and the weight of the magnesium collected after the washing was about 2 gr.

We claim:

1. A solar energy installation for the production of an alkali metal, comprising a solar reactor, means for introducing concentrated solar radiation into said solar reactor to establish therein a desired reaction temperature, said means comprising a comprising a concentrating dish or a central receiver together with a secondary concentrating device; means for separately feeding into said solar reactor carbon and alkali metal hydroxide or carbonate; means for withdrawing from said solar reactor gaseous products; and heat exchanger means for condensing vaporous alkali metal form said gaseous products.

2. A process for producing from an alkali metal hydroxide or an alkali metal carbonate, an alkali metal selected from the group consisting of sodium and postassium and at least one gaseous product selected from the group consisting of hydrogen and carbon monoxide, comprising reacting an alkali metal hydroxide or alkali metal carbonate with carbon in a solar reactor which employs concentrated solar radiation as the energy source, said concentrated solar radiation being concentrated by a concentrated dish or a central receiver together with a secondary concentrating device, thereby directly heating said alkali metal hydroxide or alkali metal carbonate and carbon to a temperature in the range of from about 800 to 1400° C.; and withdrawing said alkali metal and said at least one gaseous product from said solar reactor.

3. The process of claim 2, wherein said alkali metal hydroxide is reacted with carbon at a temperature of from about 800 to about 1000° C. to produce a gaseous mixture of alkali metal and hydrogen as a first product and liquid alkali metal carbonate as a second product; wherein said liquid alkali metal carbonate is withdrawn and further reacted with carbon at a temperature in the range of from about 1200 to about 1400° C. to produce a gaseous mixture of alkali metal and carbon monoxide.

4. A process for the production of a second metal selected from the group consisting of magnesium and aluminum from its salt which comprises:

(i) reacting a hydroxide or a carbonate of an alkali metal selected from the group consisting of sodium and potassium with carbon at a temperature in the range of 800 to 1400° C. for the production of a first metal being a member of the group consisting of sodium and potassium; and (ii) reacting said first metal product with the salt of said second metal, to produce a second metal product.

5. The claim 2 wherein alkali metal hydroxide is reacted with carbon and $H_2O$ to yield alkali metal together with carbon monoxide and hydrogen.

6. The process according to claim 2 wherein the carbon used is produced in situ by pyrolysis of a pyrolyzable carbonaceous material.

7. The process of claim 2, wherein concentrated solar radiation is used as heat source and comprising:

i) forming in a solar reactor a reaction mixture comprising a hydroxide or carbonate of said alkali metal and carbon;

ii) introducing concentrated solar radiation into said solar reactor to establish therein a desired reaction temperature;

iii) allowing a reduction/oxidation reaction to proceed within said solar reactor and separately withdrawing as products a gaseous mixture of alkali metal, carbon monoxide and, where applicable, also hydrogen; and iv) condensing vaporous alkali metal withdrawn from said solar reactor and withdrawing liquid alkali metal as product.

8. The process of claim 3, wherein concentrated solar radiation is used as heat source and comprising:

i) forming in a first solar reactor a reaction mixture including a hydroxide of said alkali metal and carbon;

ii) introducing concentrated solar radiation into said first solar reactor to establish therein a desired reaction temperature being at the range of from about 800° C. to about 1000° C.;

iii) allowing a reduction/oxidation reaction to proceed in the first solar reactor and separately withdrawing therefrom as first product a gaseous mixture comprising essentially alkali metal and hydrogen, and as second product liquid mixture comprising essentially said alkali metal and the carbonate thereof;

iv) conducting said second product mixture withdrawn from said first solar reactor into a second solar reactor concurrently with carbon;

v) introducing concentrated solar radiation into said second solar reactor to establish therein a desired reaction temperature;

vi) allowing a reduction/oxidation reaction to proceed in said second solar reactor and withdrawing therefrom as third product a gaseous mixture of sodium or potassium metal and carbon monoxide; and vii) condensing vaporous alkali metal from the gaseous mixture withdrawn from said first and second solar reactors and withdrawing liquid alkali metal as product.

9. The process of claim 7, comprising using a further solar reactor serving as a pyrolyzer, feeding a pyrolyzable carbonaceous material into said further solar reactor, introducing concentrated solar energy into said further solar reactor to establish therein a desired reaction temperature, separately withdrawing therefrom as products carbon and a gaseous mixture of hydrogen and hydrocarbons, and feeding the product carbon into the process.

10. The process according to claim 4, wherein said second metal is magnesium.

11. A solar energy installation for the production of an alkali metal, comprising first and second solar reactors, means for introducing concentrated solar radiation into said first and second solar reactors to establish therein desired reaction temperatures: means for feeding alkali metal hydroxide into said first solar reactor; means for withdrawing gaseous products from said first solar reactor; means for conducting liquid product mixture from said first solar reactor to said second solar reactor; means for withdrawing gaseous products from said second solar reactor; and the heat exchanger means for condensing vaporous alkali metal from said gaseous products.

12. A solar energy installation according to claim 11, further comprising a third solar reactor, means for introducing concentrated solar radiation into said third solar reactor to establish therein a desired reaction temperature; means for feeding pyrolyzable carbonaceous material into said third solar reactor; and means for withdrawing carbon from said third solar reactor and feeding it into said first and second solar reactors.

13. A process according to claim 8, comprising using a further solar reactor serving as pyrolyzer, feeding a pyrolyzable carbonaceous material into said further solar reactor, introducing concentrated solar energy into said further solar reactor to establish therein a desired reaction temperature, separately withdrawing therefrom as products carbon and a gaseous mixture of hydrodgen and hydrocarbons, and feeding the product carbon into the process.

* * * * *

UNITED STATES PATENT AND TRADEMARK OFFICE
CERTIFICATE OF CORRECTION

PATENT NO. : 5,980,605
DATED : November 9, 1999
INVENTOR(S) : Chengcai YAO, et al It is certified that error appears in the above-identified patent and that said Letters Patent is hereby corrected as shown below:

Title page, item   insert --[63] Related U.S. Application Data, Continuation-in-Part of Serial No. 08/700,096, August 20, 1996, abandoned--.

Signed and Sealed this

Twelfth Day of September, 2000

Attest:

Q. TODD DICKINSON

*Attesting Officer*              *Director of Patents and Trademarks*